Figure 1:
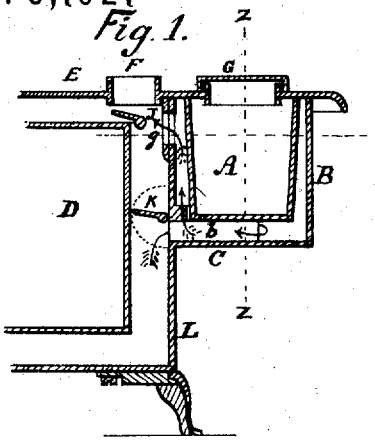

2 Sheets--Sheet 1.

G. W. SWETT.

Cooking-Stoves.

No. 6,102. Reissued Oct. 27, 1874.

Witnesses.

E. S. Babcock

Samuel Andrews

Inventor.

Geo W. Swett

THE GRAPHIC CO. PHOTO-LITH. 39 & 41 PARK PLACE, N.Y.

2 Sheets--Sheet 2.

G. W. SWETT.

Cooking-Stoves.

No. 6,102. Reissued Oct. 27, 1874.

Witnesses.
E. S. Babcock
Samuel Andrus

Inventor:
Geo W. Swett

THE GRAPHIC CO. PHOTO-LITH. 38 & 41 PARK PLACE, N.Y.

UNITED STATES PATENT OFFICE.

GEORGE W. SWETT, OF TROY, NEW YORK, ASSIGNOR, BY MESNE ASSIGNMENTS, TO HIMSELF, JULIUS F. QUIMBY, SAMUEL W. PERRY, AND DANIEL E. PARIS, OF SAME PLACE.

IMPROVEMENT IN COOKING-STOVES.

Specification forming part of Letters Patent No. 90,889, dated June 1, 1869; reissue No. 6,102, dated October 27, 1874; application filed April 30, 1874.

*To all whom it may concern:*

Be it known that I, GEORGE W. SWETT, of Troy, in the county of Rensselaer and State of New York, have invented a new and Improved Cooking-Stove; and I do hereby declare that the following is a full, clear, and exact description thereof, which will enable others skilled in the art to make and use the same, reference being had to the accompanying drawing, forming part of this specification.

This invention relates to that class of cooking-stoves known in the market and to the trade as "reservoir cooking-stoves," the chief object in view being to control, by a damper or dampers, the passage of the products of combustion in their passage through the side flues and the central flue, whereby the heated products of combustion or active currents of heat may be admitted into, or through, or around, the reservoir-chamber, or be excluded therefrom at pleasure. To such end my invention consists in the combination of a reservoir-chamber arranged behind the ordinary rear flue-space of a diving-flue cooking-stove, openings or apertures communicating between this chamber and the ascending and descending portion, respectively, of such flue-space, a damper controlling the passage of hot-air currents or products of combustion through such openings or apertures, so that the currents of hot air may be made either to traverse or pass down the side flue to the opening communicating or leading into the reservoir-chamber, thence through this chamber in direct contact with the external walls of the reservoir, and thence to the ascending flue in front of the reservoir-chamber, without having acted upon or heated the bottom of the oven; or the said products of combustion or currents of hot air may be made to pass down the side flue, under the oven, and back to the ascending flue, escaping out into the exit-pipe, in which case there will be no active circulation of the products of combustion through any part of the reservoir-chamber; or the products of combustion or active currents of heat may be made to pass around the oven, requisitely heating the same in its passage to the central rear flue, its progress upward being retarded or arrested by a damper located in the central flue, thus causing the products of combustion or active currents of heat to pass under the reservoir between flue-strips to or toward the rear of the casing; thence into and through the side flues to the front of the reservoir; thence into the central flue above the damper, and through an opening to the exit-pipe; or the heat, after acting upon and heating the oven, may be made to pass through an opening in the back plate below a damper in the central flue, and thence directly out into the exit-pipe above the damper through an opening in the back plate, in which the products of combustion or active currents of heat exert, to a great extent, their caloric upon the oven prior to acting upon the reservoir.

Thus it will be seen that the important results above mentioned are due chiefly to the employment of a damper or dampers, through the medium or operation of which the action of the products of combustion or active currents of heat upon the reservoir, as well as upon the oven, may be largely controlled—that is to say, the bottom of the oven may be highly heated independent of or without heating the reservoir; or the reservoir may be heated independent of and without heating the bottom of the oven; or the reservoir may be heated by the products of combustion in their circuit after heating the oven.

Figure 2:
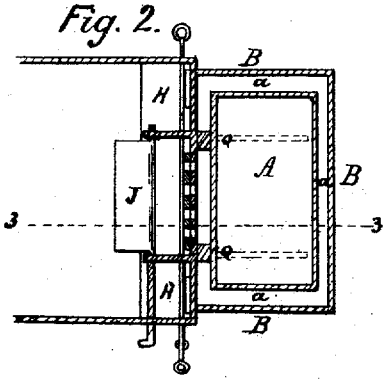
Figure 3:
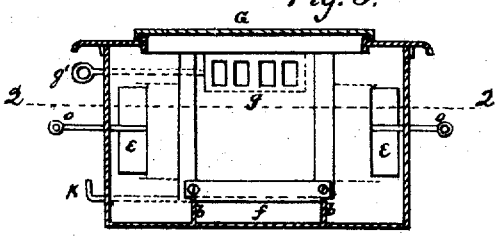
Figure 4:
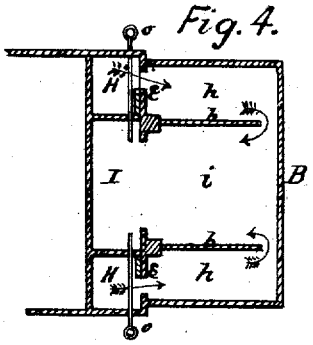
Figure 5:
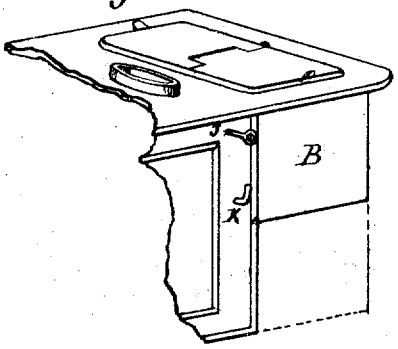
Figure 6:
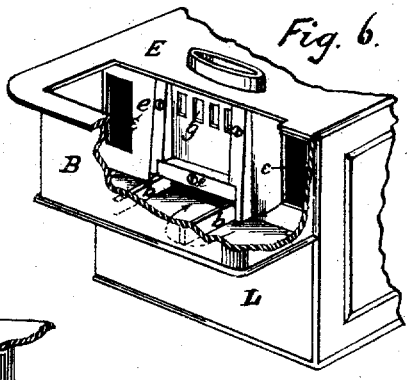
Figure 7:
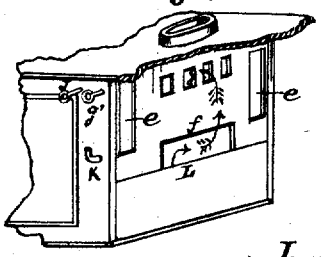
Figure 8:
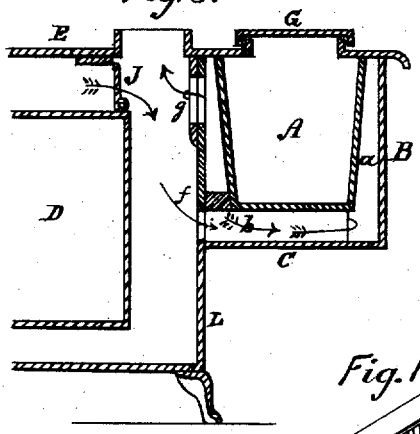
Figure 9:
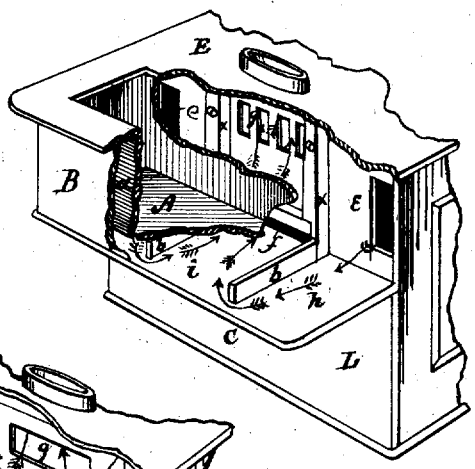
Figure 10:
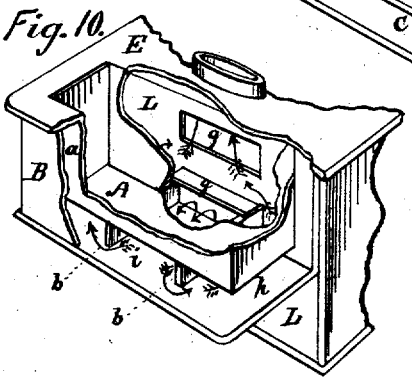
Figure 11:
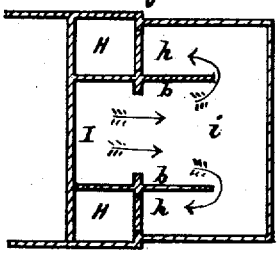
Figure 12:
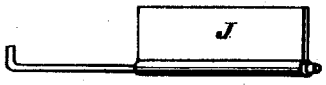
Figure 13:
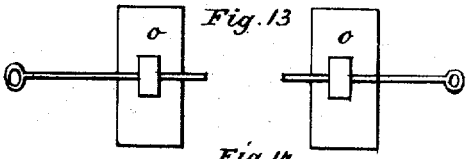
Figure 14:
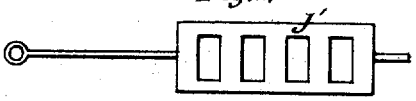

In the drawings, Figure 1 is a vertical central section of a diving-flue cooking-stove taken on the line 3 3 of Fig. 2, illustrating my invention as applied thereto. Fig. 2 is a horizontal sectional view taken on the line 2 2 of Fig. 3. Fig. 3 is a transverse view of a diving-flue cooking-stove, illustrating the various openings in the back plate. Fig. 4 is a horizontal section taken below the reservoir, showing the flue-strips and the passage of the hot air. Fig. 5 is a perspective view, showing the reservoir attached to the stove. Fig. 6 is a perspective view with the reservoir removed, a part of the casing broken away, showing the currents of heat from the side to the central flue. Fig. 7 is a perspective view of the rear of the stove, the entire reservoir-casing removed, showing the progress of the heat when the openings in the central flue only are employed. Fig. 8 is the same view as Fig. 1, showing a different passage for the heat. Fig. 9 is a perspective view of the rear portion of a diving-flue cook-stove, portions of the reservoir and casing being broken away to exhibit the flue-strips and the currents of heat from the side to the central flue as they pass in and out of the casing when not heating the oven. Fig. 10 is a perspective view similar to that shown in Fig. 9, but illustrating the passage of the heat after it has acted upon the oven. Fig. 11 is a horizontal section taken on a plane beneath the reservoir, showing the flue and the passage of the heat, as shown in Fig. 10. Fig. 12 is a view illustrating the direct-draft damper, the position of which is shown in Figs. 1 and 8. Fig. 13 is a view illustrating the double damper for controlling the passage of the heat in the side flues. Fig. 14 illustrates a damper for controlling the opening leading into the central flue, and which may be used instead of the double dampers shown in Fig. 13.

Like letters of reference indicate corresponding parts in the several figures.

In the drawings the rear portion of a diving-flue cooking-stove is illustrated, having the ordinary central or ascending flue I and side or descending flues H H. The top flue is provided with the usual direct-draft damper J, for admitting the products of combustion to pass or escape directly into the exit-pipe, but when closed compels it to pass down the side flues H, and from thence under the oven into the central or ascending flue I, thus heating the sides and bottom of the oven in the usual manner.

As the construction of the back plate of the stove and the dampers operating in connection therewith secures several different modes of heating the oven or the reservoir independently and separately of each other or both combined, I will now describe the invention, having reference to Figs. 4, 6, 8, and 9 of the accompanying drawings.

In such figures the back plate of the stove is provided with openings or apertures *e e*, which communicate with side flues H H and with an opening, *g*, communicating with a central or ascending flue, I, the former being controlled by dampers *o o*, which, when opened, permit the heat to pass from the side flues beneath the reservoir; from thence to the central or ascending flue; and then to the exit-pipe arranged above said flue in front of the reservoir-casing, the result being that the products of combustion or active currents of heat are permitted to pass directly against, to, or toward the reservoir, heating the same to a high degree by direct draft from the fire-box without having passed around the oven D.

In lieu of the dampers *o o*, arranged for the openings *e e*, the damper *g'* may be used, covering an opening or aperture, *g*, which is formed in the back plate of the stove and connecting with the central rear or descending flue thereof, in which case the reservoir will receive more heat in reverse draft when the oven is being heated, since the currents will press into the reservoir-chamber with greater expansive force on the downward than in the ascending draft.

As a modification of the above mode of heating the reservoir, the heat passes as above; but, instead of passing through the opening *g*, it may pass through an opening, *f*, formed lower down in the back plate of the stove, as illustrated in Fig. 6. The flue-strips below the reservoir may be removed or dispensed with, and when dispensed with, in this modification or the one previously described, the draft will be more direct into the smoke-pipe, the only office of the bottom flue-strips being to drive the heated products of combustion farther to the rear of the casing, which, as a general thing, will be found detrimental, especially when there be present a defective chimney-draft or inferior quality of fuel.

It will thus be seen that by this mode of heating the reservoir by direct draft the fresh and active products of combustion or currents of heat are conducted and distributed directly upon the reservoir impinging thereon, heating it with great rapidity, due to the fact that the caloric of the products of combustion is not expended or consumed by first acting upon or passing under the bottom of the oven.

When it is desired to heat the oven without heating the reservoir, the heated products of combustion or active currents of heat are caused to pass around the oven by closing the direct-draft damper J, and exert their caloric thereon, passing thence into the central rear or ascending flue, thence upward to the exit-pipe, the dampers *g*, or dampers *o o*, whichever be employed in the back plate L, being closed.

The reservoir A may be heated after the heat leaves the oven D, as well as by the direct draft, as follows: The products of combustion or active currents of heat pass around the oven and perform their office thereon, as above described; they then pass into the central rear flue I, their progress upward being arrested by a damper, K, arranged in said flue, by which they are compelled to pass under the reservoir in the flue *i* between the flue-strips *b b*, where a division of the heated currents occurs, thence passing into the side flues *h h*, as in Figs. 1, 10, and 11, thence to the front of the casing A, and again into the central flue above the damper K, through the opening *g* in the back plate of the stove to the exit-pipe.

As stated hereinbefore, the flue-strips *b b* may be omitted, in which event the products of combustion or currents of heat will pass into the casing below the damper K, and thence upward, escaping through an opening, *g*, in the back plate of the stove into the exit-pipe F located in front of the reservoir, as shown in Fig. 7; but it is evident that if the flue-plate *y* be removed or omitted the currents of heat will pass through the opening

*f* in the back plate, and then ascend and pass out of the opening *g* above the damper K, whether the flue-strips *b b* be removed or not.

In low incased reservoir cooking-stoves, with the exit-pipe placed over the rear ascending flue in front of the reservoir, I am aware that heretofore the reservoir has been heated by introducing the products of combustion through an aperture in the back plate into the reservoir-chamber, and then returning thence to the exit-pipe without passing under the oven; that such method of heating has been controlled by a damper placed over such aperture leading from the rear flues into the reservoir-chamber; but it is believed that this has never been done prior to this invention, when a flue-space has been created, not only about the vertical walls of the reservoir, but also between the bottom of the reservoir and the bottom of the casing, thereby gaining a much larger surface of the reservoir for the direct impact of the caloric in the flue or reservoir-chamber. I am also aware that flue-strips have heretofore been in use in a reservoir-chamber for the purpose of forcing the hot-air currents back into the reservoir-chamber; but they are horizontal, and placed along the sides and ends of the reservoir, extending out to the casing, thus dividing the space between the reservoir and casing into an upper and lower flue-chamber; but it is believed that never, prior to this invention, have flue-strips been used of the nature and adapted to perform the functions of those herein described.

Having thus described my invention, what I claim is—

1. In a diving-flue cooking-stove, provided with a reservoir-casing located back of the rear flues thereof, and having openings through the back plate leading into said casing, the combination of the flue-strips with the reservoir which rests thereon, and the casing forming flues beneath said reservoir, through which the products of combustion pass to the ascending flue without passing under the oven, substantially as set forth.

2. The combination, in a diving-flue cooking-stove, of a damper or dampers, arranged in or on the back or rear casing thereof, with a reservoir-casing or flue-chamber located in the rear of the stove, a flue-space being created between the bottom of the reservoir and the bottom of the casing, said damper or dampers when opened permitting the currents of heat to pass through the casing or flue-chamber for heating a reservoir connected therewith, and when closed to drive the heat under the oven for heating the same, thus heating the reservoir without heating the bottom of the oven, and the bottom of the oven without materially heating the reservoir, substantially as set forth.

3. A reservoir-casing or flue-chamber, with a flue-space created between the bottom of the reservoir and the bottom of the casing, located in the rear of a three-flued cooking-stove, with dampered apertures or openings from the side flues into said reservoir-casing or flue-chamber, in combination with an opening into the rear ascending flue, through which active currents of heat are allowed to pass from the side to the center rear flue, for the purpose of heating a water-reservoir connected therewith, without heating the oven, substantially as set forth.

4. In a diving-flue cooking-stove having apertures or openings from the descending flues through the stove back into a reservoir-casing or chamber, with a flue-space created between the bottom of the reservoir and the bottom of the casing, such chamber being located in rear of said flues, the combination of such descending flues having such apertures with a damper placed in the ascending flue, by means of which damper the products of combustion can be made to pass from the descending flues into the reservoir-chamber, and from thence into the ascending flue to the exit-pipe without passing under the oven, substantially as set forth.

5. A reservoir-casing or flue-chamber formed in the rear of a diving-flue cooking-stove, provided with a vertical flue plate or plates between the casing and the reservoir, and upon the front side thereof, for the purpose of conducting the currents of heat back into the reservoir-chamber, by means of which the hot currents of heat are distributed back into the casing or flue chamber, as they pass from the rear descending flue or flues to the rear ascending flue, for heating a reservoir connected with said casing or flue-chamber, substantially as set forth.

6. A reservoir-casing or flue-chamber formed in the rear of a diving-flue cooking-stove, combined with a horizontal flue plate or plates upon the bottom of the said casing, and upon which the reservoir rests, for conducting currents of heat along the sides and end or ends thereof, by means of which the hot currents of heat are distributed throughout the casing or flue-chamber, as they pass from the rear descending flue or flues to the rear ascending flue, for heating a reservoir connected with said casing or flue-chamber, substantially as set forth.

7. The combination of a reservoir casing or flue-chamber formed in the rear of a diving-flue cooking-stove with a flue plate or plates in the front and bottom thereof for conducting currents of heat along the sides and end or ends of a water-reservoir therein contained, by means of which the hot currents of heat are distributed throughout the casing or flue-chamber, as they pass from the rear descending flue or flues to the rear ascending flue, for heating a reservoir connected with said casing or flue-chamber, substantially as set forth.

In testimony whereof I have hereunto set my hand.

GEORGE W. SWETT.

Witnesses:

SAMUEL ANDRUS,

E. D. BABCOCK.